US005702774A

United States Patent [19]

Griffin et al.

[11] Patent Number: 5,702,774

[45] Date of Patent: Dec. 30, 1997

[54] METHOD OF PREVENTING WICKING

[75] Inventors: Michael F. Griffin; James L. Pajan, both of Simpsonville, S.C.

[73] Assignee: Westinghouse Air Brake Company, Wilmerding, Pa.

[21] Appl. No.: 227,151

[22] Filed: Apr. 13, 1994

Related U.S. Application Data

[62] Division of Ser. No. 666,988, Mar. 11, 1991, abandoned.

[51] Int. Cl.[6] .................................................. B29C 35/08

[52] U.S. Cl. .......................... 427/598; 427/127; 427/128; 427/156; 427/282; 427/287; 427/292; 427/421; 428/457; 428/523; 428/692; 428/695; 428/704; 428/900

[58] Field of Search ............................ 427/598, 128–132, 427/156; 428/900, 457, 523, 695, 692, 704

[56] References Cited

PUBLICATIONS

Sign of the Times Sep. 1971.

*Primary Examiner*—Bernard Pianalto

*Attorney, Agent, or Firm*—John B. Sotak

[57] ABSTRACT

A reusable magnetic masking member for keeping a surface area of a metal object from being painted during a painting operation. The magnetic masking member includes a flexible magnetic sheet of material which is magnetically attached to the surface area of the metal object and includes an exterior vinyl film backing which may be cleaned of excessive paint after a number of reuses and repeated paintings.

17 Claims, 2 Drawing Sheets

METHOD OF PREVENTING WICKING

This is a division of application Ser. No. 07/666,988, filed Mar. 11, 1991 now abandoned.

FIELD OF THE INVENTION

This invention relates to an arrangement of easily and effectively masking certain areas of an object which is to be brush-, dip-, or spray-painted, and more particularly to a reusable magnetic paint masking member which quickly covers and protects a machined surface of a metal article from being painted and which may be readily removed after the painting operation and which may be repeatedly used to protect the same area of other articles against being painted.

BACKGROUND OF THE INVENTION

During painting or coating operations of articles of manufacture, it is necessary to keep certain areas, such as, machined surfaces, clean and free from being covered in order to ensure that the matching surfaces of an adjoining member may be quickly and easily mounted to and properly secured in place during subsequent assembly. In the past, the selected surfaces were covered with adhesive masking tape which was a slow, tedious and expensive process. For example, in the manufacturing of disc brake assemblies or units for railway vehicles, it is necessary to keep the machined face of the brake heads free of any adherent coating since it made it difficult, if not impossible, to insert the brake shoe dove tail into the brake head dove tail grooves. It will be appreciated that the use of masking tape was an effective but costly method of protecting the selected areas of an article which was to be painted. First, the workman must cover the entire relatively large brake shoe receiving surface by repeatedly and randomly placing the relatively narrow strips of masking or duct tape in an overlapping fashion. After the surface was completely covered, the sides or edges of the brake heads were hand-trimmed by razors, knives, and/or files to remove the excess tape to define a precise delineation for painting. Following the drying or curing of the paint, the masking tape is manually peeled off. The removal of the masking tape usually occurs in strips and pieces in which some adhesive and/or tape remains stuck to the surface of the brake head and some paint wicks or seeps along the edges of the brake head during the painting process. Thus, the face of the brake head must be cleaned with a suitable solvent or the like to remove these remnants before installation of the brake shoes into the brake head.

OBJECTS AND SUMMARY OF THE INVENTION

Accordingly, it is an object of this invention to provide a new and improved reusable paint masking member for keeping a select area unpainted during a painting process.

Another object of this invention is to provide a unique magnetic masking member for covering an exposed surface of a metal object from being painted during a painting operation.

A further object of this invention is to provide a masking template formed from a sheet of magnetic material having a vinyl film backing which is cut to the shape of an area to be protected during painting and which is removed after painting and is used again to protect another area.

Still another object of this invention is to provide a method of keeping an exposed machined surface of a ferromagnetic brake head unpainted during a painting process by covering the surface with a reusable magnetic masking member.

Still a further object of this invention is to provide a flexible magnetic sheeting masking template which is used to protect an area against painting by being magnetically attached to the area prior to the painting and by being readily removed after painting for reuse.

Yet another object of this invention is to provide a reusable masking arrangement comprising, a flexible magnetic sheeting having a vinyl film backing, a ferromagnetic member having a surface which is to be kept unpainted during a painting operation, the flexible magnetic sheeting and vinyl film backing having an outline conforming to the surface of the ferromagnetic member and having the flexible magnetic sheeting attracted to the surface of the ferromagnetic member so that the vinyl film backing is exposed to the paint during the painting operation.

Yet a further object of this invention is to provide a method of protecting a machined brake shoe receiving surface of a brake head from being painted, comprising the steps of:

(a) cutting a reusable magnetic masking member to conform to the machined brake shoe receiving surface;

(b) placing the cut reusable magnetic masking member against the machined brake shoe receiving surface so it is magnetically attracted thereto;

(c) painting the brake head including the cut reusable magnetic masking member;

(d) removing the cut reusable magnetic masking member from the machined brake shoe receiving surface of the brake head so that steps (b), (c), and (d) may be repeated.

In addition, it is an object of this invention to provide a reusable magnetic masking member comprising, a flexible sheet of material having a magnetized side and having a thermoplastic resin side, the flexible sheet of material having an outline conforming to the shape of a surface which is to be kept from being painted during the painting of a ferromagnetic object by being magnetically attached to the surface of said ferromagnetic object by the magnetized side of the flexible sheet of material so that the thermoplastic resin side of the flexible sheet of material is exposed to the paint during the painting of said ferromagnetic object.

An additional object of this invention is to provide a reusable magnetic masking member which is economical in cost, effective in operation, simple in design, reliable in use, and durable in service.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
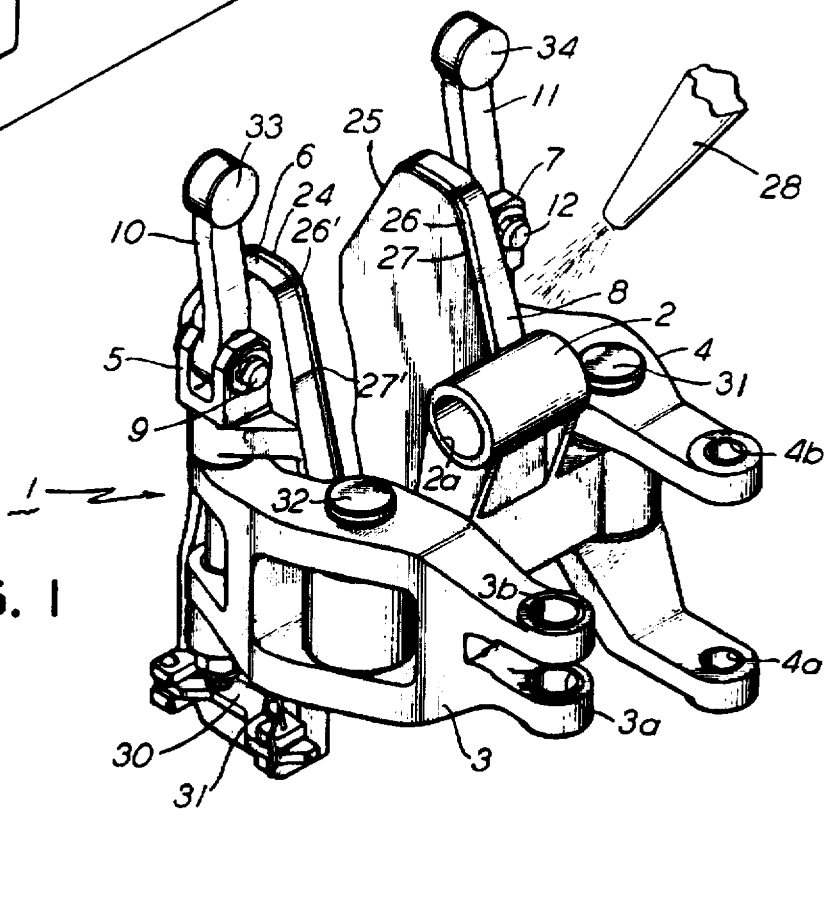
FIG. 1 is a perspective view of the assembled support bracket with the tongs and brake heads of a caliper assembly for a disc brake unit of a railway passenger vehicle.
Figure 2:
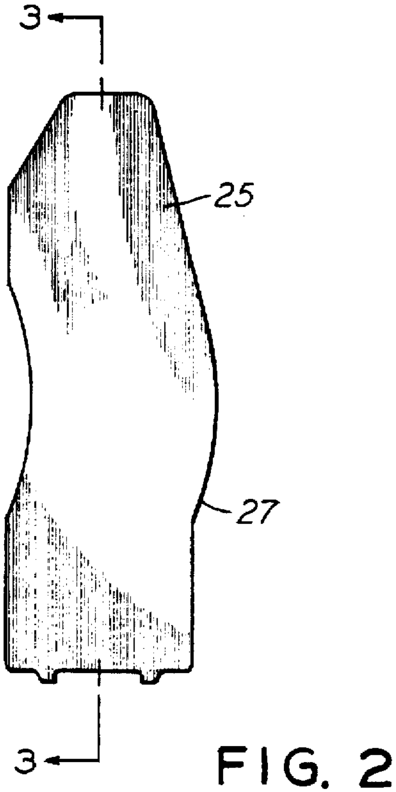
FIG. 2 is an enlarged front plan view of a reusable magnetic masking member of a right-hand brake head.

Referring now to the drawings, and in particular to FIG. 1, there is shown a typical assembled support bracket with the tongs and brake heads which make up a caliper assembly of a type 3-P disc brake unit or apparatus for use on railway passenger vehicles and lightweight rail cars.

The caliper assembly, generally characterized by numeral 1, includes a brake support bracket 2 which is pivotally connected to an outside bifurcated tong 3 by fulcrum pin 32 and which is pivotally connected to an inside bifurcated tong 4 by fulcrum pin 31. As shown, the bifurcated end of tong 3 which is disposed in operating relationship with an axle carried rotary disc (not shown) is pivotally connected by a brake head pin 5 to the left-hand brake head 6. Similarly, the bifurcated end of tong 4 which is disposed adjacent the rotary disc is pivotally connected by a brake head pin 7 to the right-hand brake head 8. The brake head 6 is pivotally connected by hanger arm pin 9 to the hanger arm 10 while the brake head 8 is pivotally connected to hanger arm 11 by hanger arm pin 12.

Prior to combining caliper assembly 1 with the pressure operated actuator (not shown), it is conventional practice to protect the cast ductile iron members of the assembly against rust and corrosion by painting the exterior surfaces. However, before the spray painting operation begins, it is necessary to take certain precautionary measures or steps to ensure that certain areas or surfaces remain unpainted. That is, the pivotal bracket support pin aperture of bracket 2, the threaded actuator pin holes, of tong 4 and the piston pin holes of tong 3 as well as frame mounting holes of hanger arms 10 and 11 are covered with suitable snap-in plastic cap plugs 33 and 34 or circular punch-outs of the magnetic sheeting. In some cases, the bushings **3*a* and 3*b* of tong 3, the bushings 4*a* and 4*b* of tong 4, and the through hole 2*a* of the pivotal bracket support 2** may be covered with grease which may be wiped clean after the paint operation.

Figure 5:
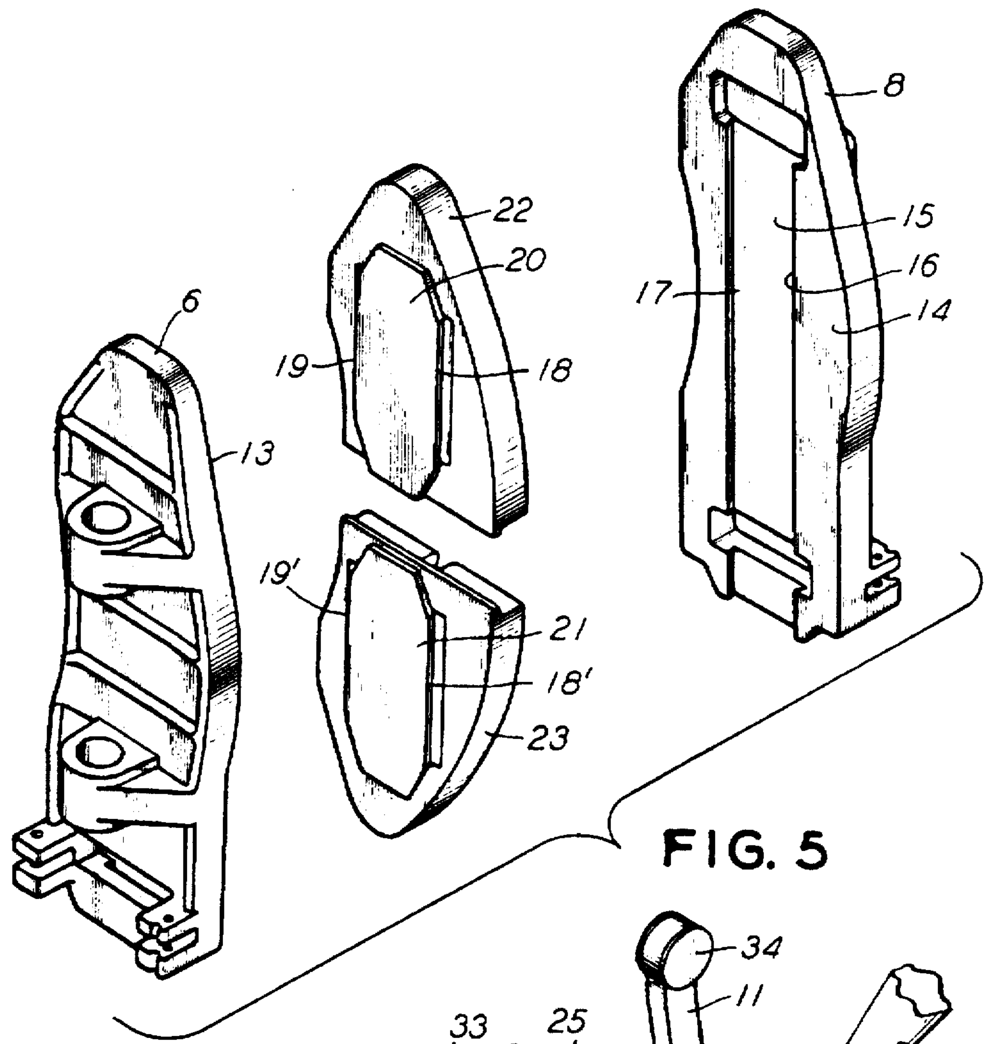
FIG. 5 is an exploded perspective view of the uncovered right-hand and left-hand brake heads and the two halves of a left-hand disc brake shoe or lining.
Figure 4:
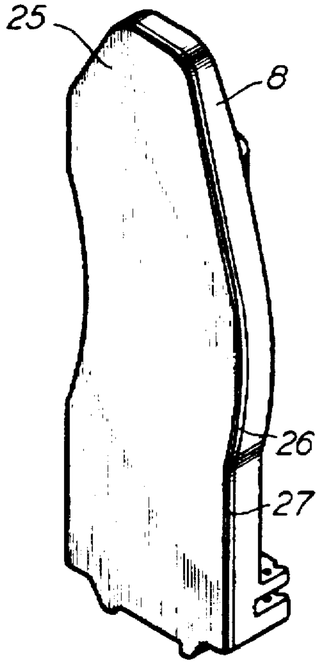
FIG. 4 is a perspective view of a right-hand brake head with the reusable magnetic masking member attached to the brake shoe receiving face.
Figure 3:
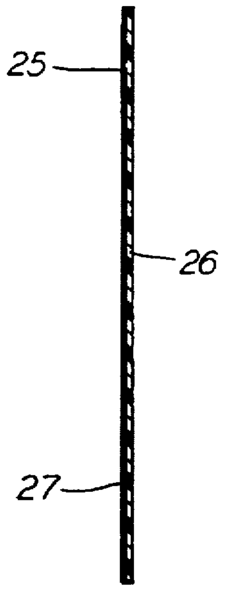
FIG. 3 is a sectional view taken along lines 3—3 of FIG. 2.

In addition, it is necessary to cover the critical machined brake shoe receiving surfaces 13 and 14 of the brake heads 6 and 8, respectively, from being painted during the spray painting operation. As shown in FIG. 5, the flat shoe receiving surfaces 13 and 14 of brake heads 6 and 8 are each formed with an elongated vertical channel, such as, 15. The sides of the channel 15 are each formed with dove tail grooves 16 and 17 which is adapted to receive the brake shoe dove tails 18, 18' and 19, 19', formed on the backing plates 20 and 21 of shoes upper and lower 22 and 23, respectively. As shown in FIGS. 1 and 4, the machined surfaces of the brake heads 6 and 8 are covered with masking laminated sheeting members 24 and 25, respectively. In practice, the commercially available sheeting includes a magnetic layer 26 and a smooth polyvinyl film or coating 27 which are precut to the contour or shape of the outline of each shoe receiving surface of the respective brake heads 6 and 8. In viewing FIGS. 1, 2, 3, and 4, it will be seen that the masking members consist of a 0.030" flexible magnetic sheet of material, such as, synthetic rubber or elastomer having magnetized barium or strontium ferrite particles interspersed therein. As previously mentioned, the formulation of the smooth magnetic sheet is ideal for applying various 0.004" coating, film, or laminate, such as, vinyl, mylar, etc. The great flexibility allows the magnetic masking member to conform to a wide variety of surfaces but has enough stiffness for easy processing. The sheeting is rugged and stays flexible and resists cracking and chipping under extreme weather conditions. As shown, the magnetic masking member is placed over the brake shoe receiving surface of the ductile iron brake heads and the magnetic sheet 26 is firmly attached by the magnetic attraction and holding force. The force of the magnetic attraction prevents the wicking of any paint during and after the spray painting operation which is directed from the paint nozzle 28. After the paint has dried, the plugs or punch-outs are removed or the grease is wiped off and the magnetic masking members 24 and 25 are removed from the brake heads 6 and 8. Then the dove tail of each brake shoe 22 and 23 is inserted into brake head dove tail grooves and the brake shoes are slid in until the end of brake shoe dove tail clears the brake head latch 30. Next, the latch locking pin 31 is inserted into the brake head.

It will be appreciated that the removed magnetic masking members 24 and 25 may be used again on another pair of brake heads which are to be painted prior to final assembling. The reuse of the magnetic masking members may be repeated in masking the brake heads and after a number of painting operations, the excess paint which has accumulated of the vinyl side of the masking members by simply peeling off and wiping the surface clean a suitable solvent or the like. As previously mentioned, the flexible magnetic masking member fits tightly over the face of the brake head and forms a paint-tight seal along peripheral edges of the brake head to prevent wicking or creepage.

It is understood that the masking member is not limited to the shape or configuration as shown in FIGS. 1, 2, 3, and 4, but that the outline or contour of the paint mask may be cut and pre-formed to various other surfaces and areas of different articles which have to be protected against being painted. Thus, the paint mask may be configured to provide a protective covering for other types of brake heads which have different shapes of brake shoe receiving surfaces. In addition, the flexible magnetic masking may be used to prevent the painting of other surface shapes of a variety iron and steel or ferromagnetic articles.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A method of preventing wicking of paint while protecting a machined brake shoe receiving surface of a brake head from being painted, comprising the steps of:

(a) selectinq a flexible sheet of magnetic material having a magnetic attraction at least sufficient to prevent wicking of paint, (b) cutting a reusable magnetic masking member from said flexible sheet to conform to the machined brake shoe receiving surface, (c) placing said cut reusable magnetic masking member against the machined brake shoe receiving surface so it is magnetically attracted thereto, (d) painting the brake head including said cut reusable magnetic masking member, (e) removing said cut reusable magnetic masking member from the machined brake shoe receiving surface of the brake head so that steps (c), (d), and (e) may be repeated.

2. The method as defined in claim 1 comprising the further step of:

(e) cleaning said cut reusable magnetic masking member after steps (b), (c), and (d) have been repeated a number of times.

3. The method as defined in claim 1, wherein said cut reusable magnetic masking member is a sheet having magnetic material on one side and having a thermoplastic resin material on the other side.

4. The method as defined in claim 3, wherein said magnetic material is magnetized barium ferrite.

5. The method as defined in claim 3, wherein said thermoplastic resin material is vinyl.

6. The method as defined in claim 1, wherein said reusable magnetic masking member is a lamination.

7. A method of preventing wicking of paint while protecting a given area of a magnetic object from being painted during a painting operation, comprising the steps of:

(a) covering the given area of the magnetic object with a magnetic masking member which is magnetically attracted to the given area of the magnetic object with sufficient force to prevent wicking of paint;

(b) painting the magnetic object as well as the magnetic masking member;

(c) permitting the paint to dry;

(d) removing the magnetic masking member from the given area of the magnetic object so that steps (a), (b), and (c) may be repeated.

8. The method as defined in claim 7, wherein the magnetic masking member is a laminate having a vinyl film on one side and having a magnetic layer on the other side.

9. The method as defined in claim 7, comprising the further step of:

(e) removing excess paint from the magnetic masking member after steps (a), (b), (c), and (d) have been repeated a number of times.

10. The method as defined in claim 7, wherein step (a) includes cutting the magnetic masking member to fit the contour of the given area of the magnetic object and placing the magnetic masking member in contact with the given area of the magnetic object.

11. A method of preventing wicking of paint while preventing a brake shoe receiving surface of a disc brake head assembly of a railway vehicle from being painted during the painting operation, comprising the steps of:

(a) pre-cutting a reusable magnetic masking template member to conform to and cover the brake shoe receiving surface of said disc brake head assembly, said reusable magnetic masking template member having sufficient magnetic attraction to prevent wicking of paint.

(b) placing said pre-cut reusable magnetic masking template member against the brake shoe receiving surface so said pre-cut reusable magnetic masking template member is magnetically attracted thereto, (c) painting the brake head assembly including said pre-cut reusable magnetic masking template member, (d) removing said pre-cut reusable magnetic masking template member from the brake shoe receiving surface of the brake head so that steps (b), (c), and (d) may be repeated on another brake shoe receiving surface of a disc brake head assembly.

12. The method as defined in claim 11, comprising the further step of:

(e) cleaning said pre-cut reusable magnetic masking template member after steps (b), (c), and (d) have been repeated a number of times on said brake shoe receiving surfaces on a number of brake head assemblies.

13. The method as defined in claim 11, wherein said pre-cut reusable magnetic masking template member is a flexible sheet of magnetic and thermoplastic resin material.

14. The method as defined in claim 11, wherein said precut reusable magnetic masking template member is a laminate having a vinyl film on one side and having a magnetic layer on the other side.

15. The method as defined in claim 11, comprising the further step of:

(e) removing excess paint from said pre-cut reusable magnetic masking template member after steps (a), (b), (c), and (d) have been repeated a number of times.

16. The method as defined in claim 11, wherein said brake head assembly is spray-painted.

17. The method as defined in claim 11, wherein step (c) is a spray-painting operation.

* * * * *